United States Patent Office 2,959,608
Patented Nov. 8, 1960

2,959,608
CHEMICAL PROCESS FOR MAKING O,O-DIALKYL-S-CARBAMOYLMETHYL-PHOSPHORODITHIO-ATES

Alan Edgar Crouch, Stapleford, and Denis William Pound, Meades, Hauxton, England, assignors to Fisons Pest Control Limited, Harston, England, a company of Great Britain No Drawing. Filed Jan. 21, 1960, Ser. No. 3,728
Claims priority, application Great Britain Jan. 30, 1959

19 Claims. (Cl. 260—461)

The present invention relates to improvements in the preparation of phosphate esters.

In British patent specification No. 663,270 is described the production of the general class of compounds of the formula:

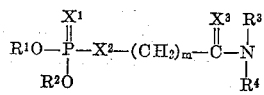

by the reaction of a phosphate of the formula

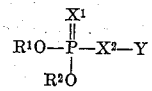

with a halogen substituted amide of the general formula

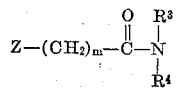

wherein the above formulae $R^1$ and $R^2$ are alkyl, aralkyl or aryl radicals, $R^3$ and $R^4$ are hydrogen or alkyl, hydroxy, alkyl, aryl or nitroaryl radicals, $X^1$, $X^2$ and $X^3$ are sulphur or oxygen, $m$ is 1 to 4 inclusive, Y represents the equivalent of an alkali-forming metal including ammonium, and Z is chlorine or bromine. It is stated that the reaction may be carried out at a temperature in the range about 20–150° C., and that high yields of the desired products are obtained by carrying out the reaction in the presence of a solvent.

In British patent specification No. 791,824 is disclosed that compounds of the formula:

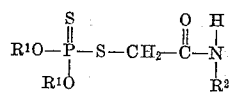

where $R^1$ is a methyl or ethyl group and $R^2$ is a methyl or isopropyl group and contains at least as many carbon atoms as $R^1$, have a particularly high parasiticidal activity against animal parasites and at the same time a surprising low toxicity to warm blooded animals. It is stated that these compounds may be prepared by reacting an alkali metal salt of the appropriate O,O-dialkyl phosphorodithioic acid with a halogen substituted appropriate N-alkylacetamide in the presence of a solvent for both reactants and at a temperature between 10° and 15° C.

Of this class of compounds the one of greatest interest is O,O-dimethyl-S-(N-methyl)-carbamoylmethyl-phosphorodithioate.

It has been found that in the preparation of this compound and related compounds where at least one of the O-alkyl groups is an O-methyl group, when using the described methods only low yields are obtained of the desired product because of the reaction between the desired product and the O,O-dialkylphosphorodithioic acid. It has now been found that in such cases very much higher yields of the desired product are obtained by carrying out the reaction in a two phase liquid system in which the product preferentially appears in one phase and the O,O-dialkylphosphorodithioic acid or its salt preferentially appears in the other phase.

Accordingly the present invention is for a process for the production of a phosphate ester of the general formula:

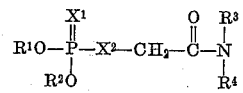

which comprises reacting together a phosphorothioate of the formula

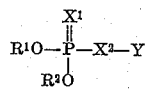

with a haloamide compound of the formula

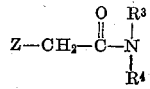

wherein the above formulae $R^1$ is methyl, $R^2$ is methyl or a lower alkyl group, for example ethyl or propyl. $X^1$ and $X^2$ are oxygen or sulphur, but at least one is sulphur, $R^3$ and $R^4$ are hydrogen, lower alkyl, for example methyl, ethyl or propyl, or together with the N atom form heterocyclic residues, for example morpholyl or pyridyl residues, Y is an alkali metal or its equivalent and Z is chlorine or bromine, wherein the reaction is carried out in a two phase liquid system, the phosphorothioate preferentially appearing in one phase and the phosphate ester product preferentially appearing in the other phase.

The term alkali metal or its equivalent is intended to cover the alkali metals including ammonium and the alkaline earth metals, for example sodium, potassium, ammonium and calcium.

If desired the phosphorothioate salt may be formed in situ by introducing into the reaction the phosphorothioic acid and an alkaline compound of the alkali metal or its equivalent. The alkaline compound may for example be a hydroxide, carbonate or bicarbonate.

According to a preferred embodiment of the invention, in the formulae indicated $R^1$ and $R^2$ are methyl groups, $X^1$ and $X^2$ are sulphur atoms, $R^3$ is hydrogen or methyl and $R^4$ is methyl, ethyl or propyl.

The two phase liquid system may comprise any two suitable immiscible phases. According to a preferred embodiment of the invention one phase comprises an aqueous phase and the other phase a substantially water-immiscible organic solvent phase. In such a system the organic solvent employed may comprise a pure compound or a mixture which forms a separate phase in the presence of water or an aqueous salt solution. The use of solvent mixtures may be advantageous where a single solvent possesses insufficient solvent power or gives unsuitable partition coefficients.

In the came of aqueous/organic solvent phases, the partition coefficient of the product between the aqueous and solvent phases should be in favour of the solvent phase, and the partition coefficient of the phosphorothioate used as starting material should be in favour of the aqueous phase. It is also preferable that ratio of the phases are adjusted so that the greater part of the haloamide starting material is present in the aqueous phase. The ratio of the aqueous phase to the organic solvent phase may vary, for example in the range 1:4 to 4:1 or wire than this and is preferably in the range 1:2 to 2:1.

Examples of solvents which may be used include ketones of 4 or more carbon atoms, for example methyl isobutyl ketone, cyclohexanone, and methyl cyclohexanone; ethers of 4 or more carbon atoms, for example dichlorodiethyl ether; alcohols of 4 or more carbon atoms, for example 3:5:5-trimethylhexanol; or hydrocarbons or halogenated hydrocarbons, for example benzene, xylene, chlorobenzene, chloroform and carbontetrachloride, or mixtures of any of these ketones, ethers, alcohols, hydrocarbons or halogenated hydrocarbons. It is to be noted that aliphatic hydrocarbons are not very satisfactory when used alone, but may be satisfactory used in mixtures, for example with ketones.

The reaction according to the present invention may be carried out at temperatures over a wide range, but is preferably carried out at a temperature in the range 15–90° C.

The present invention relates particularly to the production of O,O-dimethyl-S-(N-methyl)-carbamoyl-methyl-phosphorodithioate by the reaction of a salt of O,O-dimethylphosphorodithioic acid with N-methyl haloacetamide.

A sufficiently pure solution of the salt of O,O-dimethylphosphorodithioic acid may be obtained from the commercial acid by extraction with water, separating off the insoluble oily impurities and neutralising the aqueous extracts with a suitable base, which may be the hydroxide and/or carbonate and/or bicarbonate of one or more of the alkali metals or ammonia. Alternatively the commercial O,O-dimethyl-phosphorodithioic acid may be extracted with aqueous ammonia, and the insoluble oily impurities separated off. It is desirable that the pH of the aqueous phase during reaction should not rise above about 10, and is conveniently in the range from 3.5 to 10, and hence it may be convenient to buffer the reaction mixture, for example with bicarbonate ions, which may in turn be conveniently obtained by using an excess of carbonate or bicarbonate in the preparation of the phosphorodithioate.

The process according to the present invention when carried out with aqueous/organic solvent phases, gives a solution of O,O-dimethyl-S-(N-methyl)-carbamoylmethyl-phosphorodithioate in a solvent phase, which may require little treatment prior to formulation for use as an insecticide. Washing the solvent solution with water may be desirable, as may removal of part or all of the solvent by distillation.

The following examples are given to illustrate the process of the present invention. The composition percentages quoted are by weight unless otherwise indicated.

*Example 1*

Commercial O,O-dimethyl phosphorodithioic acid was purified by extracting three times with equal volumes of water at ambient temperature; the water insoluble impurities were separated off, leaving a Normal aqueous solution of the phosphorodithioic acid, as determined by an analytical method, depending on potentiometric titration with silver nitrate in nitric acid solution.

To the purified aqueous solution at 20° C. prepared as above and containing 0.25 gram mol of the phosphorodithioic acid was added 0.4 gram mol of sodium bicarbonate and this solution was added to 0.3 gram mol N-methyl chloracetamide dissolved in 250 millilitres of carbon tetrachloride containing 10% by volume cyclohexanone. The mixture was heated to 55° C. and kept agitating at that temperature for three hours. The mixture was then cooled to 20° C. and the layers separated and were analysed. The O,O-dimethyl-S-(N-methyl) carbamoylmethyl phosphorodithioate content of the solvent layer was 0.196 gram mol and of the aqueous layer was 0.009 gram mol, a total yield of 82% calculated on O,O-dimethyl phosphorodithioic acid. The total unreacted N-methyl chloracetamide content of the solvent and aqueous layers was 0.08 mol; the yield of the product from the net N-methyl chloracetamide used was, therefore, 93%. The O,O-dimethyl phosphorodithioate content of the aqueous layer was 0.018 gram mol; the yield of the product from the net O,O-dimethyl-phosphorodithioate was, therefore, 88%.

Solely by way of comparison commercial O,O-dimethylphosphorodithioic acid was purified as described above except that smaller volumes of water were used and the resulting aqueous solution was 2.8 Normal. 2.8 Normal aqueous solution prepared as above and containing 0.24 gram mol of the phosphorodithioic acid was added to a mixture of 0.258 gram mol of N-methyl chloracetamide and 0.6 gram mol sodium carbonate; when the effervescence had subsided, the mixture was heated rapidly to 80° C., kept at this temperature for five minutes, then cooled to 20–30° C., diluted with water and the oily layer of crude product separated off. This oily layer, which represented 68% yield calculated as O,O-dimethyl-S-(N-methyl)-carbamoylmethyl-phosphorodithioate from the phosphorodithioate, was found to contain only 66% of pure product. The yield of pure product from O,O-dimethyl phosphorodithioic acid was, therefore, only 45%. The aqueous and oily layers obtained after reaction contained no unreacted O,O-dimethyl phosphorodithioate.

Similarly solely by way of comparison commercial O,O-dimethyl phosphorodithioic acid was extracted once with 8-N-aqueous sodium hydroxide and the aqueous solution extracted once with chloroform, to dissolve and remove oily droplets of impurities, and the aqueous solution diluted to a strength of 4-Normal. To the 4-Normal aqueous solution containing 0.87 gram mol of the phosphorodithioate was added 0.87 gram mol N-methyl chloracetamide and the mixture agitated for 16 hours at 16–20° C., then diluted with water and the oil separated off. The aqueous phase was heated to 80° C. for five minutes when a further small quantity of oil was precipitated. The yields of crude oil calculated as O,O-dimethyl-S-(N-methyl)-carbamoylmethyl-phosphorodithioate from phosphorodithioate were 53% before heating and a total of 63% after heating. The pure product content of the crude oil was 65%. The yield of pure product from O,O-dimethyl phosphorodithioic acid was therefore only 41%.

*Example 2*

To a purified aqueous solution of O,O-dimethyl phosphorodithioic acid at 20° C., prepared as in Example 1 and containing 0.25 gram mol of the phosphorodithioic acid was added 0.25 gram mol sodium bicarbonate, followed by 0.5 gram mol N-methyl chloracetamide, previously dissolved in 250 millilitres of carbon tetrachloride containing 10% by volume cyclohexanone, followed finally by 0.15 gram mol sodium bicarbonate. The mixture was heated to 55° C. and kept agitating at that temperature for 200 minutes. The mixture was then cooled to 20° C. and analysed. The yield of O,O-dimethyl-S-(N-methyl)-carbamoylmethyl phosphorodithioate calculated from the phosphorodithioic acid was 83% gross and 84% net.

*Example 3*

Example 2 was repeated with the exception that a 2.3 N aqueous solution of the phosphorodithioic acid was used, obtained by a similar process to that used in Example 1 but using smaller volumes of water. Despite the small aqueous volume during the reaction period, all the sodium bicarbonate remained in solution. The yield of O,O-dimethyl-S-(N-methyl)-carbamoylmethyl phosphorodithioate calculated from the phosphorodithioic acid was 80% gross and 85% net. The yield calculated from N-methyl chloracetamide was 92% net.

*Example 4*

To a pure Normal aqueous solution of O,O-dimethyl phosphorodithioic acid at 20° C., containing 0.25 gram mol of the acid, was added 0.4 gram mol sodium bicarbonate, followed by 0.3 gram mol N-methyl chloracetamide previously dissolved in 250 millilitres of carbon tetrachloride containing 10% by volume cyclohexanone. The mixture was heated at 55° C. and kept agitating at that temperature for 200 minutes. The mixture was then cooled to 20° C. and analysed. The yield of O,O-dimethyl-S-(N-methyl)-carbamoyl-methyl phosphorodithioate calculated from the phosphorodithioic acid was 79.5% gross and 85% net; the yield calculated from N-methyl chloracetamide was 93.5% net.

*Example 5*

Example 4 was repeated with the exceptions that 0.33 gram mol N-methyl chloracetamide and 500 millilitres of solvent mixture were used. The yield of O,O-dimethyl-S-(N-methyl)-carboamoylmethyl phosphorodithioate calculated from the phosphorodithioic acid was 83% gross and 90.5% net; the yield calculated from N-methyl chloracetamide was 97% net.

*Example 6*

To one litre of a purified Normal aqueous solution of O,O-methylethylphosphoromonothioic acid was added 1 gram mol of calcium hydroxide followed by 1 gram mol of N-methyl chloracetamide dissolved in 1 litre of carbon tetrachloride containing 10% by volume of cyclohexanone. The mixture was heated and agitated, and then cooled when reaction was complete. O,O-methylethyl-S-(N-methyl)-carbamoylmethyl phosphoromonothioate was recovered in good yield from the product.

*Example 7*

To a purified Normal aqueous solution of O,O-dimethyl phosphorodithioic acid at 20° C., prepared as in Example 1 and containing 0.25 gram mol of the phosphorodithioic acid was added 0.15 gram mol acetic acid and 0.35 gram mol sodium bicarbonate, giving a solution buffered at about pH 4.7. To this was added 0.3 gram mol of N-methyl chloracetamide previously dissolved in 250 millilitres of carbon tetrachloride containing 10% by volume cyclohexanone. The mixture was heated to 55° C., kept agitating at that temperature for three hours, then cooled to 20° C. and analysed. The yield of O,O-dimethyl-S-(N-methyl)-carbamoylmethyl phosphorodithioate calculated from the phosphorodithioic acid was 75% gross and 81% net; the yield calculated from N-methyl chloracetamide was 90.5% net.

*Example 8*

To a purified 2.3 Normal aqueous solution of O,O-dimethyl phosphorodithioic acid at 20° C., prepared as in Example 3 and containing 0.25 gram mol of the phosphorodithioic acid was added 0.25 gram mol sodium bicarbonate. This solution was then added over a period of 1 hour to an agitated mixture, maintained at 55° C., of 0.3 gram mol of N-methyl chloracetamide, 225 millilitres of carbon tetrachloride, 25 millilitres of cyclohexanone, 140 millilitres of water and 0.15 gram mol sodium bicarbonate. The mixture was then maintained at this temperature for a further 170 minutes, then cooled to 20° C. and analysed. The yield of O,O-dimethyl-S-(N-methyl)-carbamoylmethyl phosphorodithioate calculated from the phosphorodithioic acid was 77% gross and 84% net; the yield calculated from N-methyl chloracetamide was 89% net.

*Example 9*

To a purified 2.3 Normal solution of O,O-dimethyl phosphorodithioic acid at 20° C., prepared as in Example 3 and containing 0.25 gram mol of the phosphorodithioic acid was added 0.4 gram mol sodium bicarbonate followed by 0.33 gram mol N-methyl chloracetamide previously dissolved in 250 millilitres carbon tetrachloride containing 2% by volume cyclohexanone. The mixture was heated to 55° C. and kept agitating at that temperature for 2½ hours. The mixture was then cooled to 20° C., when three liquid layers formed, and analysed. The yied of O,O-dimethyl-S-(N-methyl)-carbamoylmethyl phosphorodithioate calculated from the phosphorodithioic acid was 78.5% gross and 81.5% net; the yield calculated from N-methyl chloracetamide was 92% net. One half of the yield compound was contained in the central liquid layer as a 55% weight/volume solution, thus facilitating the separation of the reaction products.

*Example 10*

To one litre of a purified Normal aqueous solution of O,O-dimethylphosphorodithioic acid was added 1 gram mol of sodium bicarbonate followed by 1 gram mol of N-methyl-N-ethyl bromacetamide and 1 litre of carbon tetrachloride containing 10% by volume of cyclohexanone. The mixture was heated and agitated, and cooled when the reaction was completed. O,O-dimethyl-S-(N-methyl-N-ethyl)-carbamoylmethylphosphorodithioate was recovered in good yield from the product.

*Example 11*

To a purified Normal aqueous solution of O,O-dimethylphosphorodithioic acid at 20° C., prepared as in Example 1 and containing 0.25 gram mol of the phosphorodithioic acid was added 0.4 gram mol sodium bicarbonate followed by 0.3 gram mol N-methyl chloracetamide previously dissolved in 125 millilitres of methyl isobutyl ketone. The mixture was heated to 55° C., kept agitating at that temperature for 200 minutes, then cooled to 20° C. and analysed. The yield of O,O-dimethyl-S-(N-methyl)-carbamoylmethyl phosphorodithioate calculated from the phosphorodithioic acid was 68.5% gross and 73% net; the yield calculated from N-methyl chloracetamide was 86% net.

*Examples 12 to 24*

To a purified Normal aqueous solution of O,O-dimethyl phosphorodithioic acid at 20° C., prepared as in Example 1 and containing 0.1 gram mol of the phosphorodithioic acid was added 0.16 gram mol sodium bicarbonate. 15 grams of a technical grade of N-methyl chloracetamide, which gave a cooling curve arrest from 42.3° C. to about 40° C., was dissolved in 100 millilitres of solvent as identified in the table below. The two solutions were then mixed, heated to 65° C. and kept agitating at that temperature for the period specified in the table below. The mixture was then cooled to 20° C. and analysed.

| Example No. | Solvent | Reaction time in minutes at 65° C. | O,O-dimethyl-S-(N-methyl)-carbamoyl methyl phosphorodithioate formed, expressed as mols |
| --- | --- | --- | --- |
| 12 | Carbon tetrachloride containing 10% by volume of cyclohexanone. | 45 | 0.066 |
| 13 | ----do---- | 60 | 0.068 |
| 14 | ----do---- | 75 | 0.071 |
| 15 | ----do---- | 90 | 0.074 |
| 16 | ----do---- | 120 | 0.077 |
| 17 | 3:5:5 trimethylhexanol | 60 | 0.066 |
| 18 | ----do---- | 120 | 0.072 |
| 19 | ----do---- | 150 | 0.068 |
| 20 | Carbon tetrachloride and methyl cyclohexanone mixed 2:1 by volume. | 110 | 0.074 |
| 21 | 2:2' dichlorodiethyl ether | 120 | 0.075 |
| 22 | Chlorobenzene | 120 | 0.075 |
| 23 | Benzene | 150 | 0.068 |
| 24 | Equal volumes of tetrachlorethylene and diethylene glycol diethyl ether. | 120 | 0.073 |

Solely by way of comparison, in a similar experiment, where solvent was omitted, less than 0.050 mol of the O,O-dimethyl-S-(N-methyl)-carbamoylmethyl phosphorodithioate was formed during a 90 minute reaction period at 65° C.

*Example 25*

The procedure of Examples 12 to 24 was followed with the exception that 200 millilitres of xylene was used as solvent and the reaction was carried out by heating the agitated mixture to 80° C. during 10 minutes, maintaining it at this temperature for 5 minutes, then cooling rapidly to 20° C. The yield of O,O-dimethyl-S-(N-methyl)-carbamoylmethyl phosphorodithioate was 0.057 gram mol.

*Example 26*

The procedure of Examples 12 to 24 was followed, using chloroform as solvent, but with the exception that the reaction was carried out at 50° C. for three hours. The yield of O,O-dimethyl-S-(N-methyl)-carbamoylmethyl phosphorodithioate was 0.061 gram mol.

We claim:
1. A process for the production of a phosphate ester of the general formula:

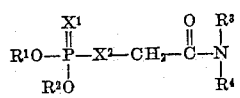

which comprises reacting together a phosphorothioate of the formula

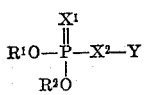

with a haloamide compound of the formula

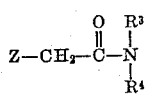

where in the above formulae $R^1$ is a methyl group; $R^2$ is a lower alkyl group; $X^1$ and $X^2$ are each selected from the group consisting of oxygen and sulphur, at least one of $X^1$ and $X^2$ being sulphur;

is selected from the group consisting of mono-(lower)-alkylamino, di-(lower)-alkylamino, N-morpholyl and N-pyridyl; Y is selected from the group consisting of alkali metal, alkaline earth metal and ammonium; and Z is selected from the group consisting of chlorine and bromine; wherein the reaction is carried out in a two phase liquid system, the phosphorothioate appearing preferentially in one phase and the phosphate ester appearing preferentially in the other phase.

2. A process for the production of a phosphate ester as claimed in claim 1 wherein $R^1$ and $R^2$ are methyl groups, $X^1$ and $X^2$ are sulphur atoms, $R^3$ is hydrogen and $R^4$ is methyl.

3. A process for the production of a phosphate ester of the general formula:

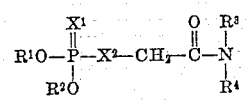

which comprises reacting together a phosphorothioate of the formula

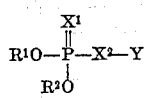

with a haloamide compound of the formula

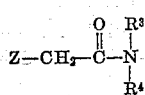

where in the above formulae $R^1$ is a methyl group; $R^2$ is a lower alkyl group; $X^1$ and $X^2$ are each selected from the group consisting of oxygen and sulphur, at least one of $X^1$ and $X^2$ being sulfur;

is selected from the group consisting of mono-(lower)-alkylamino, di-(lower)-alkylamino, N-morphyl and N-pyridyl; Y is selected from the group consisting of alkali metal, alkaline earth metal and ammonium; and Z is selected grom the group consisting of chlorine and bromine, wherein the reaction is carried out in a two phase liquid system comprising an aqueous phase and a substantially water immiscible organic solvent phase, the partition coefficient of the phosphate ester product between the aqueous and solvent phases being in favour of the solvent phase and the partition coefficient of the phosphorothioate between the aqueous and solvent phases being in favour of the aqueous phase.

4. A process for the production of a phosphate ester as claimed in claim 3 wherein the ratio of the phases is adjusted so that the greater part of the haloamide is present in the aqueous phase.

5. A process for the production of a phosphate ester as claimed in claim 3 wherein the ratio of the volume of the aqueous phase to the solvent phase lies in the range 4:1 to 1:4.

6. A process for the production of a phosphate ester as claimed in claim 3 wherein the ratio of the volume of the aqueous phase to the solvent phase lies in the range 2:1 to 1:2.

7. A process for the production of a phosphate ester as claimed in claim 3 wherein the organic solvent is selected from the group consisting of ketones of at least 4 carbon atoms, ethers of at least 4 carbon atoms, alcohols of at least 4 carbon atoms, aliphatic hydrocarbons, halogenated aliphatic hydrocarbons, aromatic hydrocarbons and halogenated aromatic hydrocarbons and mixtures of any of these.

8. A process for the production of a phosphate ester as claimed in claim 3 wherein the organic solvent is methyl isobutylketone.

9. A process for the production of a phosphate ester as claimed in claim 3 wherein the organic solvent is chloroform.

10. A process for the production of a phosphate ester as claimed in claim 3 wherein the organic solvent is 2:2'-dichlorodiethyl ether.

11. A process for the production of a phosphate ester as claimed in claim 3 wherein the organic solvent is a mixture of carbon tetrachloride and cyclohexanone.

12. A process for the production of a phosphate ester as claimed in claim 3 wherein the organic solvent is a mixture of carbon tetrachloride and methyl cyclohexanone.

13. A process for the production of a phosphate ester as claimed in claim 3 wherein the reaction is carried out at a temperature in the range 15–90° C.

14. A process for the production of a phosphate ester as claimed in claim 3 wherein the pH of the aqueous phase during the reaction is controlled to not higher than 10.

15. A process for the production of a phosphate ester of the general formula:

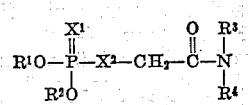

which comprises reacting together a phosphorothioic acid of the formula

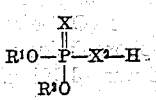

with a haloamide compound of the formula

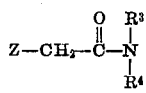

and an alkaline compound of a member selected from the group consisting of alkali metal, alkaline earth metal and ammonium radical, where in the above formulae $R^1$ is a methyl group; $R^2$ is a lower alkyl group; $X^1$ and $X^2$ are each selected from the group consisting of oxygen and sulphur, at least one of $X^1$ and $X^2$ being sulphur;

is selected from the group consisting of mono-(lower)-alkylamino, di-(lower)-alkylamino, N-morpholyl and N-pyridyl; and Z is selected from the group consisting of chlorine and bromine, wherein the reaction is carried out in a two phase liquid system, the phosphorothioic acid and salt formed from the phosphorothioic acid and the alkaline compound appearing preferentially in one phase and the phosphate ester appearing preferentially in the other phase.

16. A process for the production of a phosphate ester as claimed in claim 15 wherein $R^1$ and $R^2$ are methyl groups, $X^1$ and $X^2$ are sulphur atoms, $R^3$ is hydrogen and $R^4$ is methyl.

17. A process for the production of a phosphate ester as claimed in claim 15 wherein the two phase liquid system comprises an aqueous phase and a substantially water immiscible organic solvent phase.

18. A process for the production of a phosphate ester as claimed in claim 15 wherein the pH is maintained in the range 3.5–10.

19. A process for the production of a phosphate ester as claimed in claim 15 wherein the reaction is carried out at a temperature in the range 15–90° C.

References Cited in the file of this patent

UNITED STATES PATENTS 2,494,283    Cassaday et al. _____ Jan. 10, 1950

FOREIGN PATENTS 791,824    Great Britain _____ Mar. 12, 1958
808,853    Great Britain _____ Feb. 11, 1959

Notice of Adverse Decision in Interference

In Interference No. 92,325 involving Patent No. 2,959,608, A. E. Crouch and D. W. Pound, Chemical process for making O,O-dialkyl-5-carbamoyl-methylphosphorodithioates, final judgment adverse to the patentees was rendered Apr. 6, 1964, as to claims 1, 2, 3 and 15.

[*Official Gazette August 25, 1964.*]